(12) United States Patent
Sakakibara

(10) Patent No.: US 10,000,096 B2
(45) Date of Patent: Jun. 19, 2018

(54) PNEUMATIC TIRE

(71) Applicant: TOYO TIRE & RUBBER CO., LTD., Osaka-shi, Osaka (JP)

(72) Inventor: Kazuhiro Sakakibara, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 208 days.

(21) Appl. No.: 14/837,853

(22) Filed: Aug. 27, 2015

(65) Prior Publication Data

US 2016/0137010 A1    May 19, 2016

(30) Foreign Application Priority Data

Nov. 17, 2014 (JP) .................................. 2014-232813

(51) Int. Cl.
*B60C 19/00* (2006.01)

(52) U.S. Cl.
CPC .................................. *B60C 19/002* (2013.01)

(58) Field of Classification Search
CPC . B60C 19/002; B60C 23/0493; B60C 17/065; B60C 2017/0081
USPC ................................................. 152/155, 157
See application file for complete search history.

(56) References Cited

U.S. PATENT DOCUMENTS

| 4,392,522 A | 7/1983 | Bschorr | |
| 7,380,450 B2* | 6/2008 | Durif | B60C 23/0493 |
| | | | 73/146 |
| 2003/0020320 A1* | 1/2003 | Yukawa | B60B 3/04 |
| | | | 301/6.91 |
| 2005/0211352 A1 | 9/2005 | Ishida et al. | |
| 2006/0124216 A1 | 6/2006 | Naito et al. | |
| 2009/0038726 A1 | 2/2009 | Yukawa | |
| 2009/0266153 A1* | 10/2009 | Hironaka | B60C 23/0493 |
| | | | 73/146.5 |
| 2009/0277549 A1* | 11/2009 | Tanno | B60C 19/002 |
| | | | 152/157 |
| 2010/0032073 A1* | 2/2010 | Tanno | B60C 19/002 |
| | | | 152/532 |
| 2013/0240290 A1 | 9/2013 | Layfield et al. | |
| 2016/0031269 A1 | 2/2016 | Sakakibara | |

FOREIGN PATENT DOCUMENTS

| CN | 102119087 A | 7/2011 |
| CN | 103079842 A | 5/2013 |
| DE | 102009024454 A1 | 12/2010 |

(Continued)

OTHER PUBLICATIONS

English machine translation of JP2004-082947, dated Mar. 2004.*

(Continued)

*Primary Examiner* — Robert C Dye
(74) *Attorney, Agent, or Firm* — Westerman, Hattori, Daniels & Adrian, LLP

(57) ABSTRACT

A pneumatic tire includes a plate-like member which is attached to a tread portion inner surface by at least two attaching portions arranged with a space in a tire circumferential direction, and has a space with respect to the tread portion inner surface between the two adjacent attaching portions, wherein a through hole penetrating toward the space is formed in the plate-like member, and wherein a support member capable of supporting the plate-like member is arranged in the space.

4 Claims, 13 Drawing Sheets

(56) References Cited

FOREIGN PATENT DOCUMENTS

| DE | 10 2015 112 653 A1 | | 2/2016 |
|---|---|---|---|
| EP | 2123491 A1 | | 11/2009 |
| JP | 5-294102 A | | 11/1993 |
| JP | 7-117404 A | | 5/1995 |
| JP | 2004-082947 | * | 3/2004 |
| JP | 2004-168212 A | | 6/2004 |
| JP | 2006-306302 A | | 11/2006 |
| JP | 2008-080969 | * | 4/2008 |
| WO | 2009/124182 A1 | | 10/2009 |
| WO | 2012/028877 A1 | | 3/2012 |

OTHER PUBLICATIONS

Office Action dated Feb. 14, 2017, issued in counterpart German Patent Application No. 10 2015 117 856.7, with English translation. (10 pages).

Office Action dated Dec. 29, 2016, issued in counterpart Chinese Patent Application No. 201510599620.6, with English translation. (12 pages).

Office Action dated Nov. 28, 2017, issued in Japanese Patent Application No. JP2014-157765 (corresponds to U.S. Appl. No. 14/803,368) with translation.

Office Action dated Oct. 10, 2016, issued in Chinese Patent Application No. 201510445671.3, with English translation, (corresponds to U.S. Appl. No. 14/803,368).

Office Action dated May 4, 2017, issued in Chinese Application No. 201510445671.3, with English translation, (corresponds to U.S. Appl. No. 14/803,368).

Office Action dated Feb. 10, 2017, issued in German Patent Application No. 102015112653.2, with English translation, (corresponds to U.S. Appl. No. 14/803,368).

Non-Final Office Action dated Oct. 26, 2017, issued in U.S. Appl. No. 14/803,368.

* cited by examiner

PNEUMATIC TIRE

BACKGROUND OF THE INVENTION

Field of the Invention

The present invention relates to a pneumatic tire which can reduce cavernous resonance sound by attaching a plate-like member to an inner surface of a tread portion.

Description of the Related Art

In the case that a vehicle travels on a rough road surface or climbs over a joint of the road surface, noise that is road noise may be generated in a vehicle. The road noise is one of the noise which has a relation with the tire. In the case that the tire is vibrated by receiving the irregularities of the road surface, the cavernous resonance sound is energized in an inner portion of the tire by the vibration, and the noise in the vehicle is caused.

In Patent Document 1, there is described a pneumatic tire in which a sound control material made of a sponge material is arranged in a tire inner cavity surrounded by a rim and the pneumatic tire, for the purpose of reducing the road noise. However, the sponge material mentioned above is in danger of increasing a whole weight of the tire so as to cause deterioration of fuel consumption. Further, there is a problem of causing an increase of cost since a large number of sponge materials are required.

In Patent Document 2, there is described a pneumatic tire in which a partition wall partitioning an interior of an air chamber in a circumferential direction is provided within the air chamber which is formed between a tire inner peripheral surface and a rim outer peripheral surface, for the purpose of preventing deterioration of the road noise while suppressing a great cost increase. An equivalent length of an air column within the air chamber becomes shorter by using the partition wall to partition the interior of the air chamber in the circumferential direction, so that resonant frequency of air column resonance can be shifted, thereby preventing deterioration of the road noise due to the air column resonance.

Further, in Patent Document 3, there is provided a pneumatic tire in which a thin elastic divider plate extending approximately in an axial direction within a tire inner cavity is provided in an inner wall of the tire, for the purpose of reducing road noise caused by cavernous resonance sound while suppressing an increase in weight. A whole sound pressure mode within the tire inner cavity changes and an in-vehicle noise level is reduced, by the provision of the elastic divider plate within the tire inner cavity.

However, the partition wall and the divider plate vibrate by themselves and may deteriorate the road noise due to the cavernous resonance sound as a new sound source.

PRIOR ART DOCUMENT

Patent Document

Patent Document 1: JP-A-2006-306302
Patent Document 2: JP-A-7-117404
Patent Document 3: JP-A-5-294102

SUMMARY OF THE INVENTION

Consequently, an object of the present invention is to provide a pneumatic tire which can reduce cavernous resonance sound while suppressing an increase in weight and an increase in cost.

The object can be achieved by the following present invention. That is, the present invention provides a pneumatic tire including a plate-like member which is attached to a tread portion inner surface by at least two attaching portions arranged with a space in a tire circumferential direction, and has a space with respect to the tread portion inner surface between the two adjacent attaching portions, wherein a through hole penetrating toward the space is formed in the plate-like member, and wherein a support member capable of supporting the plate-like member is arranged in the space.

In the pneumatic tire according to the present invention, the plate-like member in which the through holes are formed is attached to the inner surface of the tread portion. The plate-like member is attached by two attaching portions which are arranged so as to be spaced in the tire circumferential direction, and has the space with respect to the inner surface of the tread portion between these two attaching portions. More specifically, through holes are formed in the plate-like member which is in a floating state from the inner surface of the tread portion between the attaching portions. Generally, in the case that the sound passes through the through hole, viscous damping is generated by friction between the air and the inner wall surface of the through hole, and pressure loss damping is generated by vortex which is generated by passing. As a result, the sound is damped. Therefore, since the sound within the tire passes through the through holes by attaching to the inner surface of the tread portion the plate-like member in which the through holes are formed, the cavernous resonance sound can be damped and reduced. Further, since it is not necessary to provide a large number of sound absorbing materials and sound control materials made of the sponge material, the increase in weight and the increase in cost can be suppressed. Further, in the present invention, since the support member is arranged in the space between the plate-like member and the tread portion inner surface, the plate-like member can be prevented from being crushed against the tread portion inner surface due to the centrifugal force in connection with the rotation of the tire and the through hole can be prevented from being closed. As a result, the cavernous resonance sound can be damped and reduced not only at the low to middle speed but also at the high speed.

In the pneumatic tire according to the present invention, the support member is preferably formed by a porous material.

With this configuration, it is possible to obtain the sound absorbing effect of the support member itself while suppressing the weight increase due to the support member.

In the pneumatic tire according to the present invention, the support member is preferably formed into a tubular shape which extends along a tire width direction.

Since the air layer is formed in the case that the support member is formed into the tubular shape, the effect of absorbing the sound passing through the support member made of the porous material is enhanced.

In the pneumatic tire according to the present invention, the support member is preferably pinched by the plate-like member and the tread portion inner surface.

With this configuration, the support member can be prevented from falling away from the space during the traveling. Further, since it is not necessary to fix the support member to the plate-like member or the tread portion inner surface by an adhesive agent, the weight increase can be suppressed.

In the pneumatic tire according to the present invention, a plurality of the plate-like members are preferably arranged at even intervals in the tire circumferential direction.

With this configuration, the provision of a plurality of plate-like members can effectively enhance the cavernous resonance sound by enhancing the damping effect by means of the plate-like member. Further, the arrangement of the plate-like members at the uniform intervals in the tire circumferential direction can suppress deterioration of uniformity and weight balance.

DETAILED DESCRIPTION OF THE PREFERRED EMBODIMENTS

Figure 1:
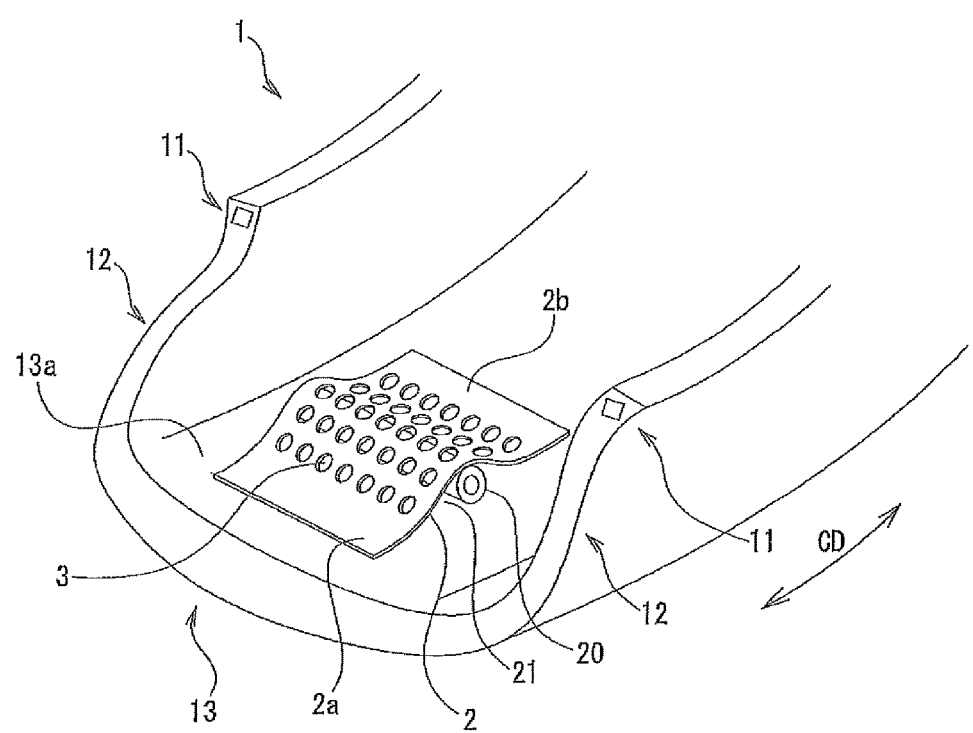
FIG. 1 is a perspective view showing an example of a pneumatic tire according to the present invention.
Figure 2A:
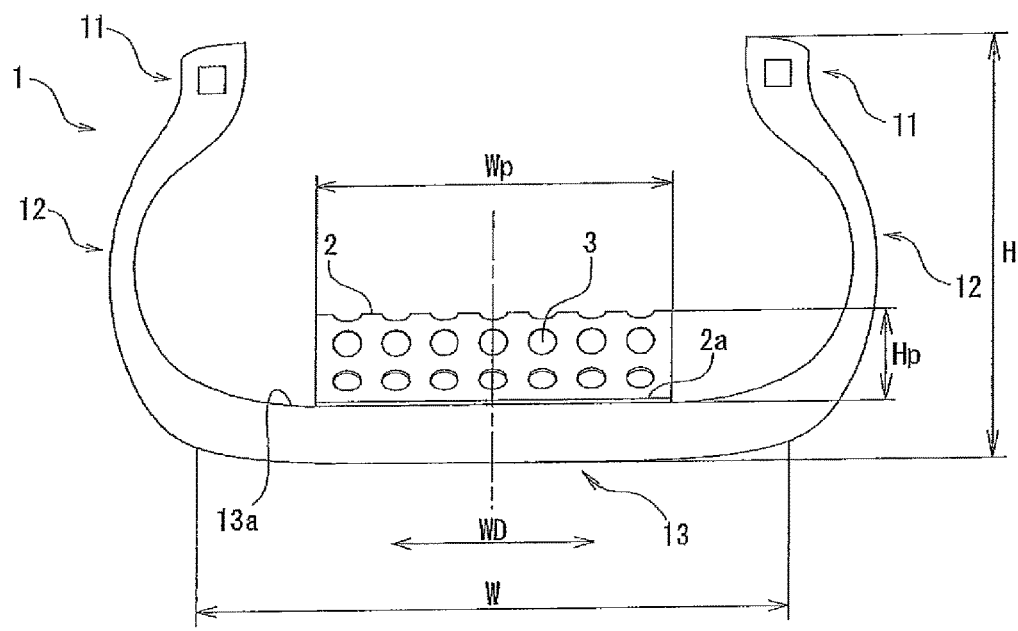
FIG. 2A is a cross sectional view in a tire meridian of the pneumatic tire.
Figure 2B:
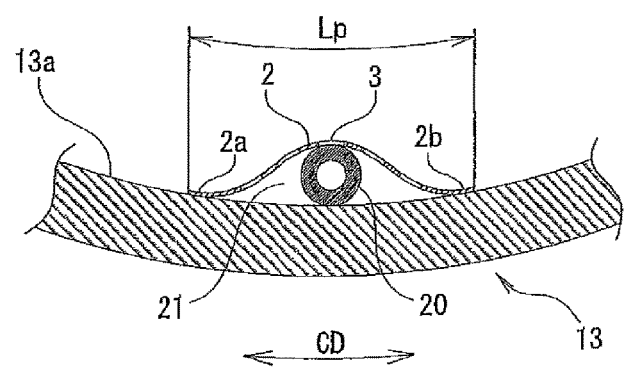
FIG. 2B is a cross sectional view in a tire circumferential direction of the pneumatic tire.

A description will be given below of embodiments according to the present invention with reference to the accompanying drawings. FIG. 1 is a perspective view showing an example of a pneumatic tire. FIG. 2A is an example of a cross sectional view in a tire meridian of the pneumatic tire. FIG. 2B is an example of a cross sectional view in a tire circumferential direction of the pneumatic tire. Here, reference symbol H denotes a tire cross sectional height. The tire cross sectional height H is a height from a nominal rim diameter to a tread surface in a state of being filled with an air pressure in JATMA regulation, in the tire meridian cross section.

As shown in FIGS. 1 and 2A, a pneumatic tire 1 is provided with a pair of annular bead portions 11, side wall portions 12 each of which extends to an outer side in a tire diametrical direction from each of the bead portions 11, and a tread portion 13 which is connected to an outer end in the tire diametrical direction of each of the side wall portions 12.

The pneumatic tire 1 is provided with a plate-like member 2 which is attached to a tread portion inner surface 13a. The plate-like member 2 is attached to the tread portion inner surface 13a by two attaching portions 2a and 2b which are arranged so as to be spaced in a tire circumferential direction CD. The plate-like member 2 is curved so as to protrude toward an interior in the tire diametrical direction between two attaching portions 2a and 2b, and has a space 21 with respect to the tread portion inner surface 13a between two adjacent attaching portions 2a and 2b.

In the present embodiment, the attaching portions 2a and 2b are arranged respectively in both ends of the plate-like member 2; however, the attaching portions 2a and 2b are not necessarily arranged in both ends of the plate-like member 2. Further, as long as at least two attaching portions are arranged in one plate-like member 2, three or more attaching portions may be arranged.

Through holes 3 penetrating toward a space 21 are formed in the plate-like member 2. Only one through hole 3 may be formed, however, it is preferable that a plurality of through holes 3 are formed as in the present embodiment. A penetrating direction of the through holes 3 is not necessarily vertical to a plate surface of the plate-like member 2, but may be set to any direction in which the through holes 3 penetrate from an outer portion to an inner portion of the space 21.

A description will be given of an effect of damping cavernous resonance sound by the through holes 3. When the sound passes through the through hole 3, the cavernous resonance sound is damped by friction between the air serving as a medium and an inner wall surface of the through hole 3 (a viscous damping). Further, when the sound passes through the through hole 3, vortex is generated by the passage of the sound to generate pressure loss, thereby damping the cavernous resonance sound (pressure loss damping). As a result, since the sound within the tire passes through the through holes 3 by attaching to the tread portion inner surface 13a the plate-like member 2 in which the through holes 3 are formed, the cavernous resonance sound can be damped and reduced.

Further, the viscous damping and the pressure loss damping when the sound passes through the through holes 3 have a relation with a particle velocity of the air. As the through holes 3 are arranged at a place where particle velocity is large, the cavernous resonance sound is effectively damped. Further, since the air flow is added to the velocity, the through holes 3 are preferably arranged at a place where the air flow exists.

Figure 3:
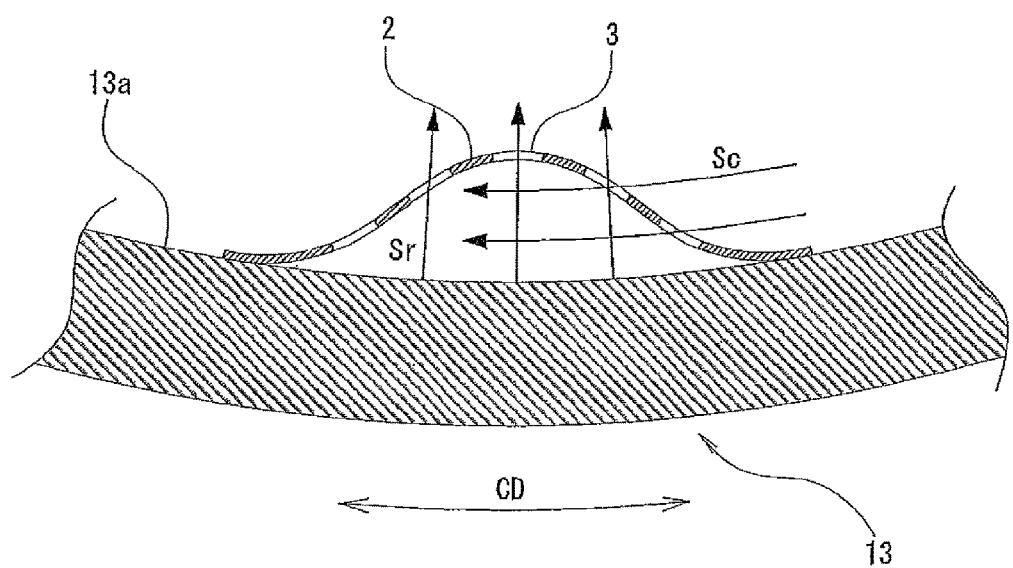
FIG. 3 is an enlarge cross sectional view showing a plate-like member in an enlarged manner.

FIG. 3 is an enlarged cross sectional view showing the plate-like member 2 in which the through holes 3 are formed, in an enlarged manner (a support member as mentioned below does not shown in the figure). The air flow within the tire is denoted by arrows. The air flow Sr and the air flow Sc in a tire circumferential direction CD exist within the tire, in which the air flow Sr is generated by deformation of the tire on the basis of grounding with a road surface, and the air flow Sc is generated by restoration of the deformation. Since the sound generated by the input from the road surface and the air flow Sr in the tire diametrical direction pass through the through holes 3 by arranging the plate-like member 2 so as to cover the tread portion inner surface 13a, the cavernous resonance sound can be effectively reduced. Further, since the sound transmitted in the tire circumferential direction CD and the air flow Sc in the tire circumferential direction CD pass through the through holes 3 by attaching the plate-like member 2 so as to protrude toward an interior in the tire diametrical direction, the cavernous resonance sound can be effectively reduced.

Further, the closer to the tread portion inner surface 13a the air flow is, the faster the air flow is. As a result, in the present invention, the plate-like member 2 in which the through holes 3 are formed is attached to the tread portion inner surface 13a.

A support member 20 which can support the plate-like member 2 is arranged in the space 21. The plate-like member 2 is preferably structured such that its thickness is reduced, in order to suppress the weight increase. However, if the thickness is reduced, in the case that the tire rotates at the high speed, the plate-like member 2 is crushed against the tread portion inner surface 13a due to the centrifugal force and thereby the through hole is closed. Accordingly, there is a risk that the effect of reducing the cavernous resonance sound by the through hole 3 is not obtained or is lowered. On the other hand, the deformation of the plate-like member 2 can be suppressed by making the plate-like member 2 thick or hard; however, the weight is increased or the following property to the deformation of the tire is obstructed, so that there is a risk that the other performances and the durability are adversely affected. According to the present invention, the arrangement of the support member 20 in the space 21 can prevent the plate-like member 20 from being crushed, thereby reducing the cavernous resonance sound not only at the low to middle speed but also at the high speed.

The support member 20 is preferably formed by a porous material. As a result, the sound absorbing effect of the support member 20 itself can be obtained while the weight increase by the support member 20 is suppressed. Here, the porous material is constructed, for example, by a sponge or an unwoven fabric. The porous material is not limited to them; however, the sponge constituted by a soft polyurethane foam is preferably employed. Further, in the case that the unwoven fabric is used as the porous material, the support member 20 is formed by rounding or folding the unwoven fabric.

The support member 20 according to the present embodiment is formed into a tubular shape which extends along a tire width direction WD. In the case that the support member 20 is formed into the tubular shape, the air layer is formed in the inner portion thereof. As a result, the effect of absorbing the sound passing through the support member 20 constructed by the porous material is enhanced. The shape of the support member 20 is not particularly limited as long as the shape can support the plate-like member 2 against the centrifugal force, but may be constructed by a solid columnar shape. Further, the support member 20 does not necessarily support the plate-like member 2 as a whole in the tire width direction, but may be formed into a shape which can support at least a part of the plate-like member 2.

Further, the shape of the support member 20 is particularly preferably a cylindrical shape. In the case that the support member 20 is formed into the cylindrical shape, the sound absorbing effect can be achieved against the sound from all the angles. The cross sectional shape of the support member 20 may be formed into a polygonal shape such as a triangular shape and a quadrangular shape in addition to the circular shape.

The support member 20 is preferably pinched by the plate-like member 2 and the tread portion inner surface 13a. In the case that the support member 20 is formed by the porous material as mentioned above, it is preferable to arrange the support member 20 in a compressed state by making the height of the support member 20 higher than the distance between the plate-like member 2 and the tread portion inner surface 13a. The height of the support member 20 may be made lower than the distance between the plate-like member 2 and the tread portion inner surface 13a. In this case, the support member 20 is fixed to the tread portion inner surface 13a by an adhesive agent or an adhesive tape.

The thickness of the plate-like member 2 is preferably between 0.1 and 10 mm, and more preferably between 0.5 and 2 mm. If the thickness of the plate-like member 2 is made thinner than 0.1 mm, the effect of reducing the cavernous resonance sound by the plate-like member 2 becomes smaller. On the other hand, if the thickness of the plate-like member 2 is made thicker than 10 mm, the tread portion inner surface 13a is locally increased in weight by the plate-like member 2. Thus, a high-speed uniformity tends to be deteriorated, and vibration and riding quality caused by the deterioration tend to be deteriorated.

The maximum height Hp from the tread portion inner surface 13a in the tire equator of the plate-like member 2 is preferably equal to or more than tenth part of the tire cross sectional height H (or 10 mm). If the maximum height Hp of the plate-like member 2 is made lower than tenth part of the tire cross sectional height H, an effect of reducing the cavernous resonance sound by the plate-like member 2 becomes smaller. On the other hand, the maximum height Hp of the plate-like member 2 is preferably equal to or less than half of the tire cross sectional height H. If the maximum height Hp of the plate-like member 2 is made higher than half of the tire cross sectional height H, the plate-like member 2 comes into contact with the rim flange when assembling the rim, which may cause a failure.

A width Wp in a tire width direction WD of the plate-like member 2 is preferably between 30 and 120% of a grounding width W. If the width Wp of the plate-like member 2 is made narrower than 30% of the grounding width W, the effect of reducing the cavernous resonance sound becomes smaller. On the other hand, if the width Wp of the plate-like member 2 is made wider than 120% of the grounding width W, the plate-like member 2 may come into contact with the inner surface of the side wall and the following property to the curved surface may be deteriorated due to deformation at the grounding time, which may cause a failure.

A length Lp in the tire circumferential direction of the plate-like member 2 is preferably equal to or less than half of the grounding length and more preferably equal to or less than third part thereof. The length Lp in the tire circumferential direction of the plate-like member 2 is preferably set to a size which can divide the grounding length into two or more parts for covering the grounding part in the step-in and the kick-out.

Figure 4:
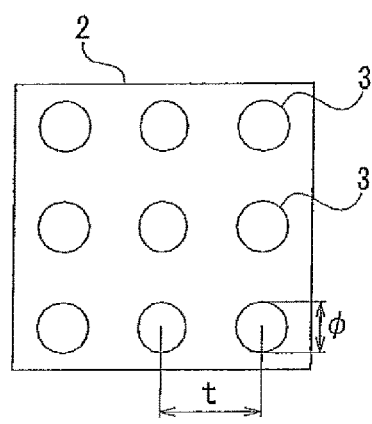
FIG. 4 is a plan view of the plate-like member.

FIG. 4 is a plan view showing a state in which a part of the plate-like member 2 is extended in a planar manner. A hole diameter φ of the through hole 3 is preferably between 0.4 and 10 mm, and more preferably between 1 and 3 mm. If the hole diameter φ is smaller than 0.4 mm, the resistance becomes too larger when the sound and the air pass through the hole, thereby failing to be effective, and being hard to be manufactured. On the other hand, if the hole diameter φ is larger than 10 mm, the resistance becomes too small when the sound and the air passes through the hole, and the damping effect becomes smaller.

Further, a rate of hole area P is preferably between 1 and 20%, and more preferably between 1 and 10%. If the rate of hole area P is smaller than 1%, the resistance becomes too large when the sound and the air passes through the hole, thereby failing to be effective. On the other hand, if the rate of hole area P is larger than 20%, the resistance becomes too small when the sound and the air passes through the hole, and the damping effect becomes smaller. On the assumption that a hole distance between the through holes 3 is t, the rate of hole area P in the case that a plurality of through holes 3 are vertical and horizontally arranged in parallel with each other like in the present embodiment is defined by equation $P=(\pi \times \varphi^2)/(4 \times t^2)$. For example, on the assumption that the hole diameter $\varphi$ is 3 mm, and the hole distance t is 10 mm, the rate of hole area P is about 7%.

The hole distance t between the through holes 3 is appropriately set by the rate of hole area P and the hole diameter $\varphi$ by using the equation mentioned above. However, for example, the hole distance t is preferably between 1 and 30 mm, and more preferably between 5 and 15 mm. If the hole distance t is smaller than 1 mm, the number of holes becomes necessarily larger, the resistance becomes too small when the sound and the air pass through the hole, and the damping effect becomes smaller. Further, a strength of the plate itself is deteriorated. On the other hand, if the hole distance t is larger than 30 mm, the number of holes becomes necessarily smaller, and the obtained damping effect becomes smaller.

The plate-like member 2 is formed by a plate-like or film-like resin. A general-purpose resin such as PET, PU, TPU, PVC, PC, PE or PEN can be exemplified as the resin.

Figure 5:
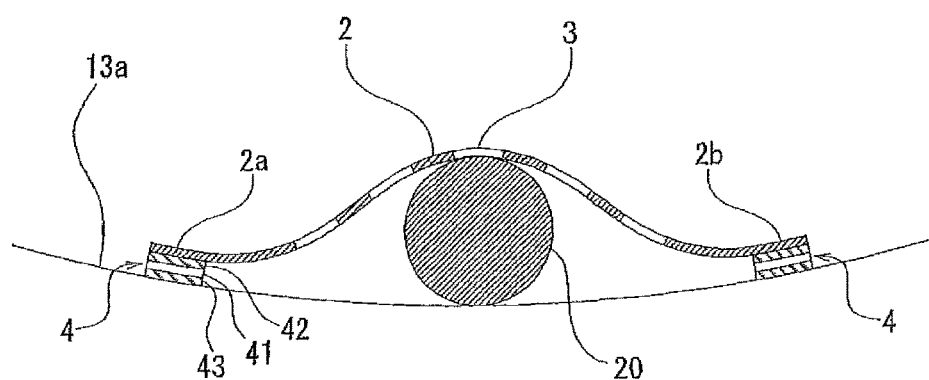
FIG. 5 is a cross sectional view in a tire circumferential direction of a pneumatic tire according to the other embodiment.

The plate-like member 2 is attached to the tread portion inner surface 13*a* by the attaching portions 2*a* and 2*b*. The plate-like member 2 is fixed to the tread portion inner surface 13*a* by an adhesive agent or a double-faced tape. At this time, as shown in FIG. 5, the plate-like member 2 is preferably fixed to the tread portion inner surface 13*a* via a cushion layer 4. The cushion layer 4 is constructed by a cushion layer main body 41 having retractility, and adhesive agent layers 42 and 43 in both sides of the cushion layer main body 41. As a result, since the cushion layer main body 41 in the cushion layer 4 deforms and can follow the shape of the curved surface of the tread portion inner surface 13*a* and the deformation at the grounding time, the plate-like member 2 can be stably fixed to the tread portion inner surface 13*a*.

A weight of the plate-like member 2 is preferably equal to or less than 15 g, and more preferably equal to or less than 10 g. The weight of the plate-like member 2 causes a local weight increase of the tread portion inner surface 13*a*, a high-speed uniformity tends to be deteriorated, and vibration and riding quality caused by the deterioration tend to be deteriorated. In the case that the cushion layer 4 is provided, the total weight including the plate-like member 2 and the cushion layer 4 is preferably made equal to or less than 20 g, and more preferably equal to or less than 15 g.

Figure 6:
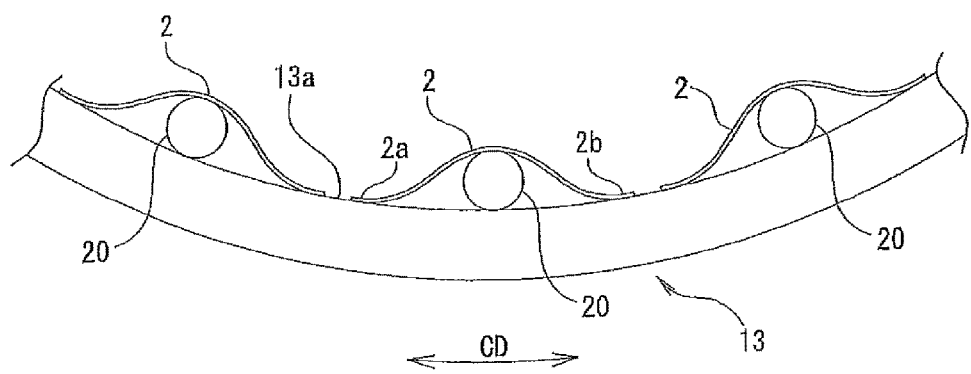
FIG. 6 is a front elevational view of a pneumatic tire according to the other embodiment.
Figure 7:
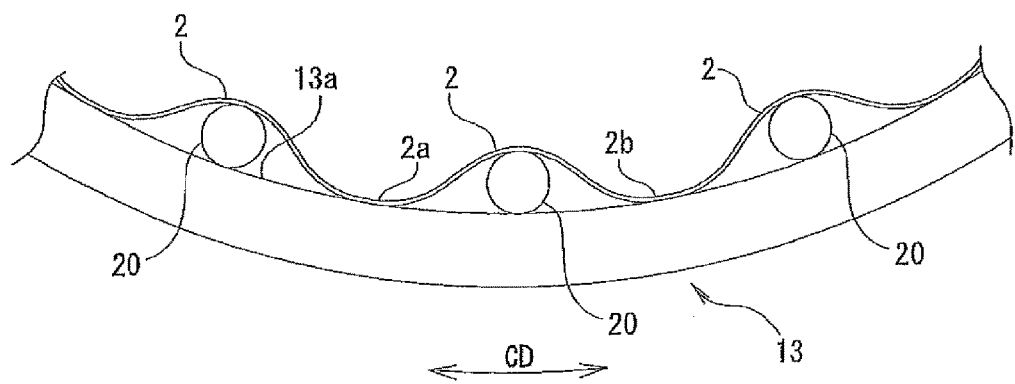
FIG. 7 is a front elevational view of a pneumatic tire according to the other embodiment.

Other Embodiments (1) In the present invention, the pneumatic tire 1 is preferably provided with a plurality of plate-like members 2, and a plurality of plate-like members 2 are preferably arranged at even intervals in the tire circumferential direction CD, as shown in FIG. 6. Further, a plurality of plate-like members 2 can be arranged so as to connect the adjacent plate-like members 2 to each other as shown in FIG. 7.

Figure 8:
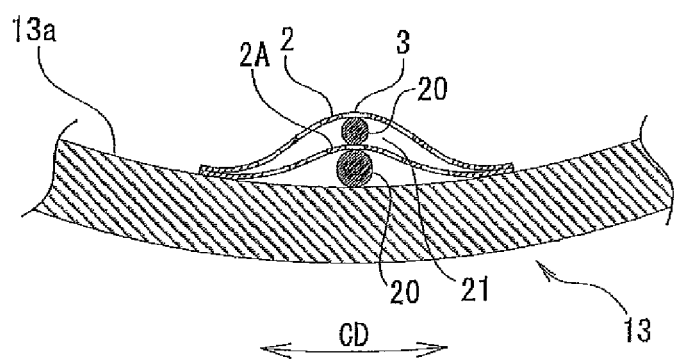
FIG. 8 is a cross sectional view in a tire circumferential direction of a pneumatic tire according to the other embodiment.

(2) In the present invention, the additional plate-like member 2A is preferably arranged in a space 21 between the plate-like member 2 and the tread portion inner surface 13*a*, as shown in FIG. 8. As a result, the air flowing in the tire diametrical direction and the tire circumferential direction passes through the through holes 3 of a plurality of plate-like members 2 and 2A, so that the cavernous resonance sound can be effectively reduced. The support members 20 may be arranged at a portion between the plate-like member 2 and the plate-like member 2A and a portion between the plate-like member 2A and the tread portion inner surface 13*a*, as shown in FIG. 8; however, the support member 20 may be arranged only at one of the portions. In the case that the support member 20 is arranged between the plate-like member 2 and the plate-like member 2A, the support member 20 is not in contact with the tread portion inner surface 13*a*. As a result, this case is advantageous in durability. The plate-like member may be arranged in a two-ply manner like FIG. 8, or may be arranged in a three or more-ply manner.

Figure 9:
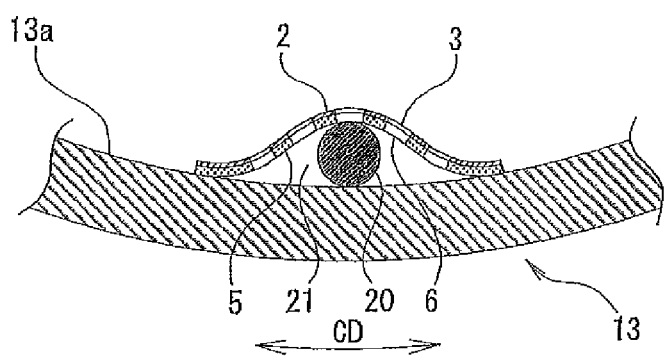
FIG. 9 is a cross sectional view in a tire circumferential direction of a pneumatic tire according to the other embodiment.

(3) In the present invention, a porous sound absorbing plate 5 is preferably stuck on a plate surface of the plate-like member 2 and a through hole 6 is preferably formed at a position corresponding to the through hole 3 in the porous sound absorbing plate 5, as shown in FIG. 9. The porous sound absorbing plate 5 may be stuck on at least one plate surface of the plate-like member 2, however, may be stuck on both the plate surfaces of the plate-like member 2. Further, the porous sound absorbing plate 5 is particularly preferably stuck on the plate surface facing the space 21 among two plate surfaces of the plate-like member 2. Further, the plate-like member 2 on which the porous sound absorbing plate 5 is stuck like FIG. 9 may be arranged in a plurality of piles like FIG. 8. A material of the porous sound absorbing plate 5 is not particularly limited; however, a sponge constructed by a soft polyurethane foam is preferably employed. The material of the porous sound absorbing plate 5 is not limited to the soft polyurethane foam as long as the material has the sound absorbing effect, and a fiber material such as a glass wool and an unwoven fabric may be employed. A thickness of the porous sound absorbing plate 5 is preferably between 3 and 15 mm.

Figure 10:
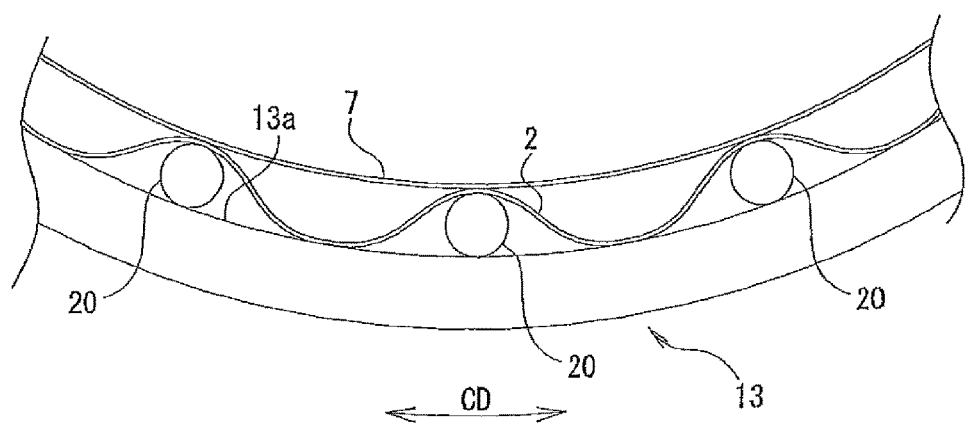
FIG. 10 is a front elevational view of a pneumatic tire according to the other embodiment.

(4) A porous plate 7 in which through holes are formed may be arranged in an interior in the tire diametrical direction of the plate-like member 2, as shown in FIG. 10. The through holes are formed in the porous plate 7, and the porous plate 7 has an effect of reducing the cavernous resonance sound in the same manner as the plate-like member 2, so that the cavernous resonance sound can be further reduced.

Figure 11:
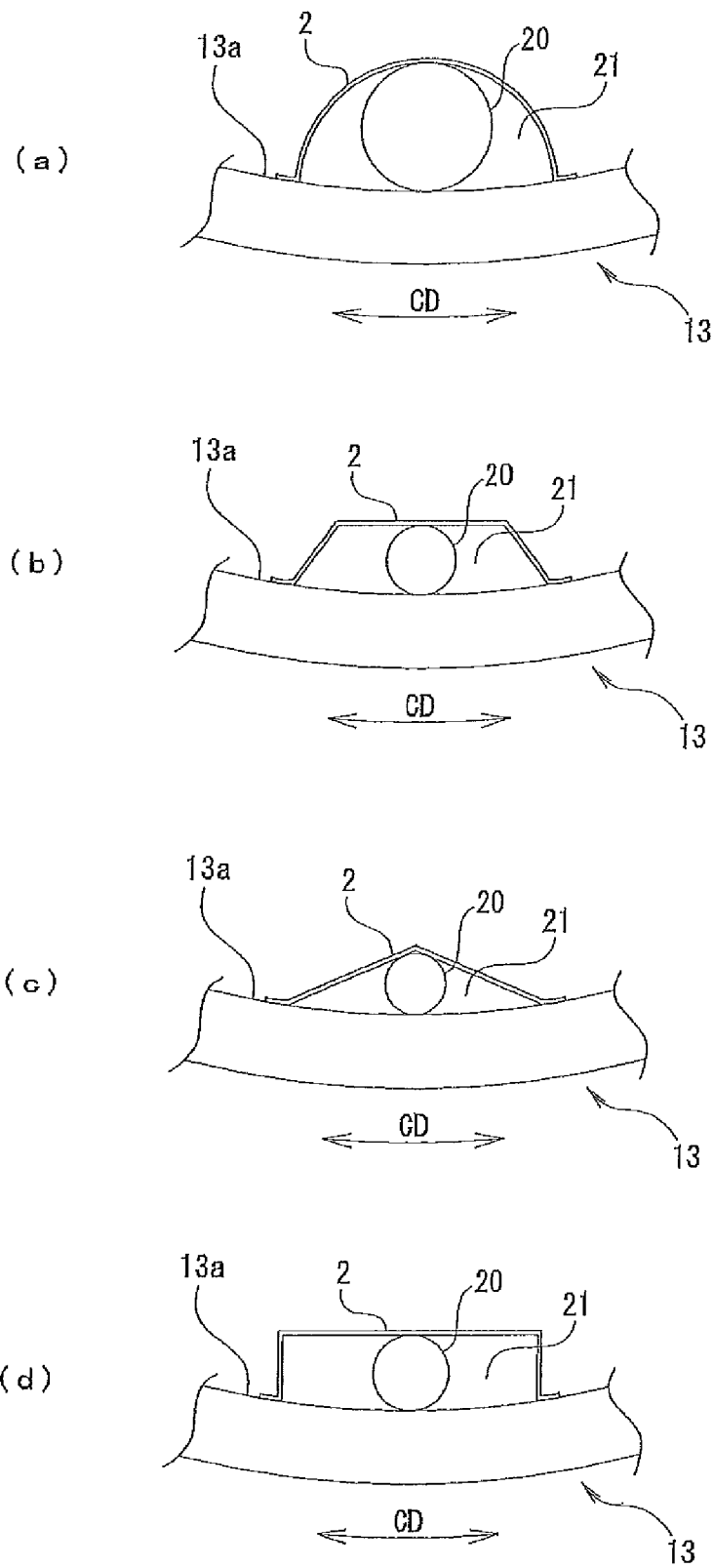
FIG. 11 is a front elevational view of a pneumatic tire according to the other embodiment.

(5) In the embodiment mentioned above, the plate-like member 2 is formed into a curved shape so as to protrude toward the interior in the tire diametrical direction between two attaching portions 2*a* and 2*b*. FIG. 11 shows side elevational views of the plate-like members 2 according to the other embodiments. As shown in FIG. 11, the plate-like member 2 may be curved or bent, and has a shape that is not limited particularly as long as the plate-like member 2 is formed into a shape which has the space 21 with respect to the tread portion inner surface 13*a* between two adjacent attaching portions 2*a* and 2*b*.

Figure 12:
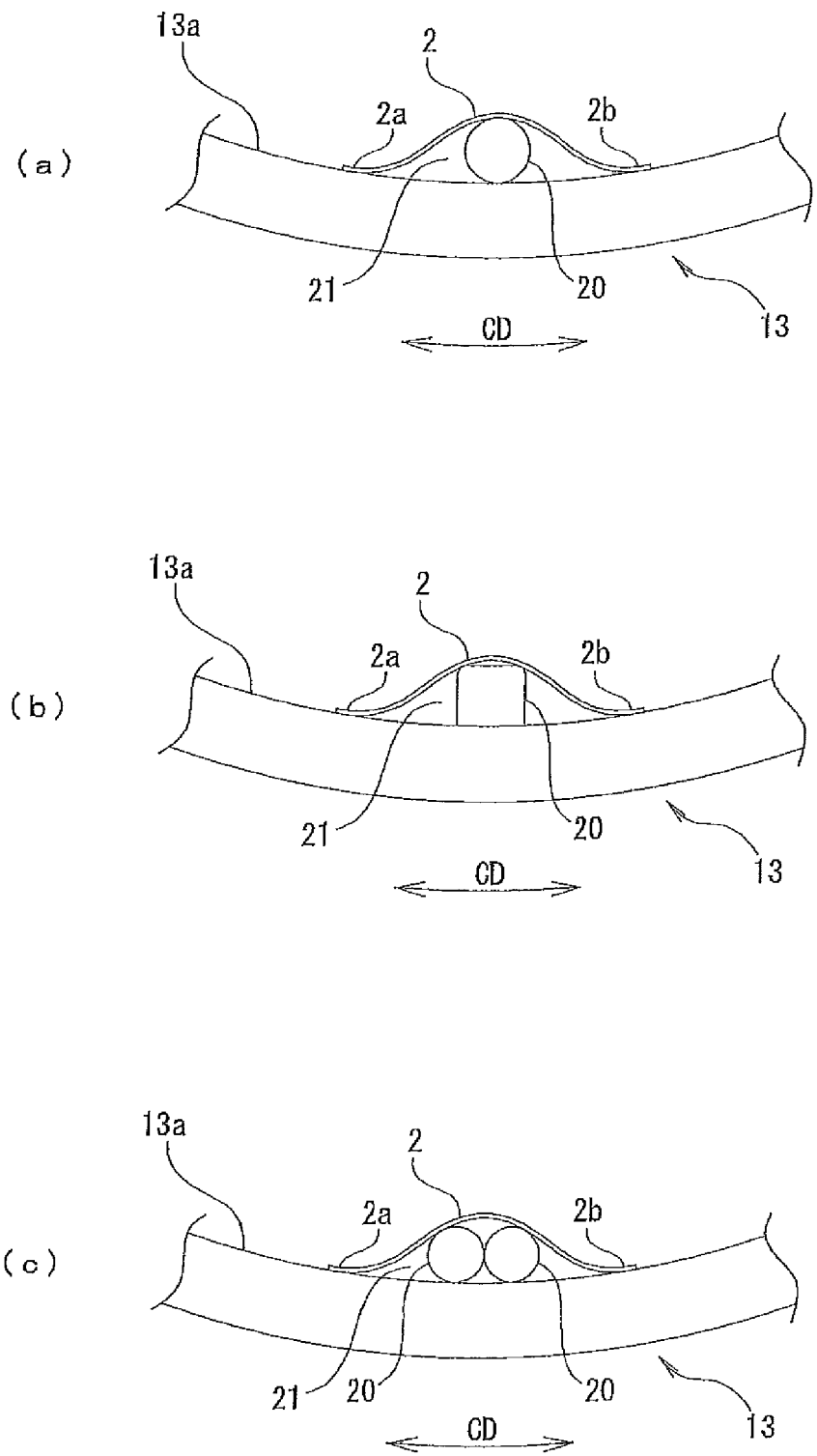
FIG. 12 is a front elevational view of a pneumatic tire according to the other embodiment.

(6) The shape of the support member 20 is not limited to the shape mentioned above. For example, the shape may be a solid columnar shape as shown in FIG. 12A. Further, the shape may be a solid quadratic prism shape as shown in FIG. 12B. Further, a plurality of support members 20 may be arranged as shown in FIG. 12C.

Figure 13:
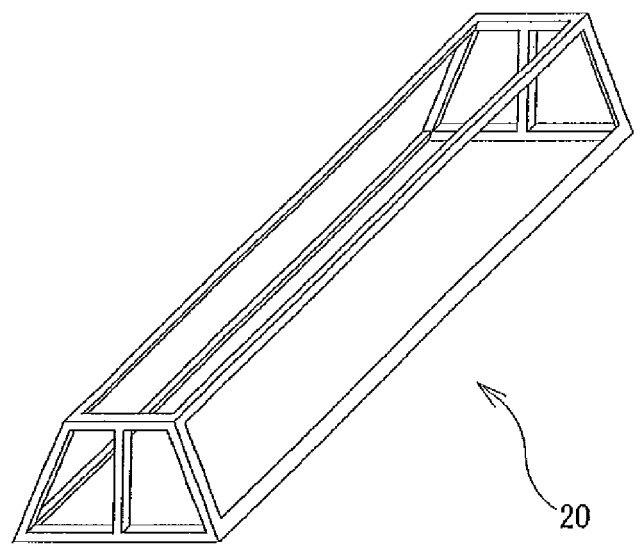
FIG. 13 is a perspective view of a support member according to the other embodiment.

(7) Further, the support member 20 may not be formed by the porous material. For example, the support member 20 may be constructed by a resin frame as shown in FIG. 13. General-purpose resins such as PET, PU, TPU, PVC, PC, PE and PEN are exemplified as the resin. The shape of the frame is not limited to the shape having a trapezoidal cross section, but may be formed into the shapes having a triangular cross section and a rectangular cross section.

Figure 14:
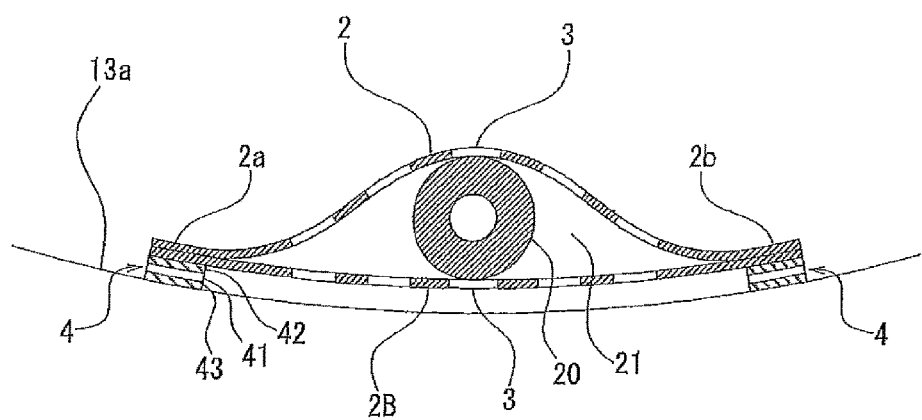
FIG. 14 is a cross sectional view in a tire circumferential direction of a pneumatic tire according to the other embodiment.

(8) The present invention is not limited to the embodiment mentioned above, but can be improved and modified variously within the range which does not deviate from the scope of the present invention. For example, the present invention may be structured such that a plate-like member 2B is added to the embodiment shown in FIG. 5, as shown in FIG. 14. More specifically, the other plate-like member 2B is arranged between the support member 20 and the tread portion inner surface 13a, in the space 21 between the plate-like member 2 and the tread portion inner surface 13a. According to the structure, it is possible to avoid the direct contact between the support member 20 and the tread portion inner surface 13a, and it is possible to prevent mutual damage. For example, in the case that the support member 20 is formed by a vulnerable sponge, the support member 20 is easily damaged by the direct contact between the support member 20 and the tread portion inner surface 13a. On the other hand, in the case that the support member 20 is constructed by a frame which is made of a hard resin, the tread portion inner surface 13a is easily damaged by the direct contact between the support member 20 and the tread portion inner surface 13a. The support member 20 and the tread portion inner surface 13a can be prevented from being damaged by attaching the plate-like member 2B to the tread portion inner surface 13a in a non-contact state and arranging the support member 20 between the plate-like member 2 and the plate-like member 2B as shown in the drawing.

EXAMPLES

A description will be given below of examples which specifically show the structure and the effect of the present invention. Evaluation items in the examples will be measured as follows.
Noise Measurement
A pneumatic tire having a tire size 195/65R15 was attached to an actual car and a sound pressure level (dB) was measured in a driver seat when traveling on an uneven road surface at 60 km/h and 80 km/h. The evaluation is denoted by an index number on the assumption that a reference example is 100, and the smaller numerical value indicates the smaller cavernous resonance sound. Results of evaluation are shown in Table 1.

Reference Example

A structure in which the plate-like member and the support member are not provided was set to the reference example.

Comparative Example 1

A structure in which the plate-like member is provided was set to a comparative example 1, in relation to the reference example.

Comparative Example 2

A structure in which two plate-like members each having a sponge (a porous sound absorbing plate) attached to one plate surface are provided was set to a comparative example 2, in relation to the reference example.

Example 1

A structure in which the resin frame as shown in FIG. 13 is arranged was set to an example 1, in relation to the comparative example 1.

Example 2

A structure in which the columnar sponge as shown in FIG. 12A is arranged was set to an example 2, in relation to the comparative example 1.

Example 3

A structure in which the cylindrical sponge as shown in FIG. 2B is arranged was set to an example 3, in relation to the comparative example 1.

Example 4

A structure in which the columnar sponge is arranged between the plate-like member and the plate-like member and between the plate-like member and the tread portion inner surface was set to an example 4, in relation to the comparative example 2.

TABLE 1

|  | Reference example | Comparative example 1 | Comparative example 2 | Example 1 | Example 2 | Example 3 | Example 4 |
|---|---|---|---|---|---|---|---|
| Plate-like member | — | One sheet | Two sheets | One sheet | One sheet | One sheet | Two sheets |
| Porous sound absorbing plate | — | — | ○ | — | — | — | ○ |
| Support member | — | — | — | Frame | Column | Cylinder | Column |
| Sound pressure level (60 km/h) | 100 | 90 | 80 | 90 | 85 | 80 | 77 |
| Sound pressure level (80 km/h) | 100 | 100 | 100 | 90 | 85 | 80 | 77 |

The following matters can be known from the results in Table 1. The pneumatic tires according to the examples 1 to 4 could reduce the cavernous resonance sound in comparison with the reference example. Further, the pneumatic tires according to the examples 1 to 4 could reduce the cavernous resonance sound even at the high speed (80 km/h) in the same manner as at the middle speed (60 km/h). The pneumatic tires according to the comparative examples 1 and 2 could reduce the cavernous resonance sound at the middle speed (60 km/h), however, could not reduce the cavernous resonance sound since the plate-like member was crushed due to the centrifugal force at the high speed (80 km/h).

What is claimed is:
1. A pneumatic tire comprising a plate-like member which is attached to a tread portion inner surface by at least two attaching portions spaced apart in a tire circumferential direction, and has a space with respect to the tread portion inner surface between the at least two adjacent attaching portions, wherein a through hole penetrating toward the space is formed in the plate-like member, and wherein a support member capable of supporting the plate-like member is arranged in the space, and wherein the support member is formed into a tubular shape which extends along a tire width direction.

2. The pneumatic tire according to claim 1, wherein the support member is formed by a porous material.

3. The pneumatic tire according to claim 1, wherein the support member is pinched by the plate-like member and the tread portion inner surface.

4. The pneumatic tire according to claim 1, wherein a plurality of the plate-like members are arranged at even intervals in the tire circumferential direction.

\* \* \* \* \*